United States Patent
Hwang et al.

(10) Patent No.: US 11,605,958 B2
(45) Date of Patent: Mar. 14, 2023

(54) ELECTRIC VEHICLE CHARGING METHOD FOR PREVENTING INRUSH CURRENT AND DEVICE FOR THE SAME

(71) Applicant: SK Signet Inc., Jeollanam-do (KR)

(72) Inventors: Ho Chul Hwang, Gyeonggi-do (KR); Chung Youl Lee, Gyeonggi-do (KR); Ho Byung Chae, Seoul (KR); Kyung Se Moon, Gyeonggi-do (KR); Jae Uk Ham, Gyeonggi-do (KR)

(73) Assignee: SK SIGNET INC., Yeonggwang -gun (KR)

( * ) Notice: Subject to any disclaimer, the term of this patent is extended or adjusted under 35 U.S.C. 154(b) by 0 days.

(21) Appl. No.: 17/536,949

(22) Filed: Nov. 29, 2021

(65) Prior Publication Data

US 2022/0166240 A1 May 26, 2022

Related U.S. Application Data

(63) Continuation of application No. PCT/KR2021/007759, filed on Jun. 21, 2021.

(30) Foreign Application Priority Data

Sep. 22, 2020 (KR) .................. 10-2020-0122162
Jun. 14, 2021 (KR) .................. 10-2021-0076934

(51) Int. Cl.
*H02J 7/00* (2006.01)
*H01M 10/44* (2006.01)
*H02M 1/36* (2007.01)

(52) U.S. Cl.
CPC ........ *H02J 7/00304* (2020.01); *H02J 7/0013* (2013.01); *H02J 7/00032* (2020.01);
(Continued)

(58) Field of Classification Search
CPC .......... B60L 53/14; B60L 53/65; B60L 53/66; B60L 53/305; B60L 2240/547
See application file for complete search history.

(56) References Cited

U.S. PATENT DOCUMENTS

2006/0217931 A1* 9/2006 Klaffenbach ............. G06F 1/28
  702/187
2010/0264983 A1* 10/2010 Nation .................. G06F 1/3203
  327/540
(Continued)

FOREIGN PATENT DOCUMENTS

JP  5260679 B2  10/1993
JP  H11243640 A  *  9/1999
(Continued)

OTHER PUBLICATIONS

Notice of Reasons for Refusal cited in Japanese patent application No. 2021-571516; dated Sep. 27, 2022; 5 pp.

*Primary Examiner* — David V Henze-Gongola
*Assistant Examiner* — Tarikh Kanem Rankine
(74) *Attorney, Agent, or Firm* — Lempia Summerfield Katz LLC

(57) ABSTRACT

A method for preventing an inrush current of an electric vehicle charger may include the steps of determining whether there is a need for an increase or decrease in a charging current level while currently supplied to an electric vehicle to be charged; decreasing the charging current level at a predetermined ratio when it is determined that there is the need for the increase or decrease in the charging current level; checking whether an inrush current occurs for a first time; activating or deactivating at least one charging module to increase or decrease the charging current level according to the request of the electric vehicle to be charged, when the inrush current does not occur for the first time; checking whether the inrush current occurs for a second time; and (Continued)

increasing the charging current level by the charging current level requested by the electric vehicle to be charged, when the inrush current does not occur for the second time.

7 Claims, 10 Drawing Sheets

(52) U.S. Cl.
CPC ......... *H02J 7/00714* (2020.01); *H01M 10/44* (2013.01); *H02M 1/36* (2013.01); *Y02E 60/10* (2013.01); *Y02T 10/70* (2013.01); *Y02T 10/7072* (2013.01)

(56) References Cited

U.S. PATENT DOCUMENTS

| | | | | |
|---|---|---|---|---|
| 2010/0274407 | A1* | 10/2010 | Creed | H02J 3/28 700/295 |
| 2013/0009599 | A1* | 1/2013 | Yukizane | B60L 53/11 320/109 |
| 2014/0009134 | A1* | 1/2014 | Bernardon | H02M 3/156 323/284 |
| 2015/0130423 | A1* | 5/2015 | Tajima | B60L 53/22 320/137 |
| 2015/0266386 | A1 | 9/2015 | Matsuda et al. | |
| 2017/0106761 | A1 | 4/2017 | Tajima | |
| 2017/0225575 | A1 | 8/2017 | Noro et al. | |
| 2018/0105060 | A1* | 4/2018 | McQuillen | H02J 7/0068 |
| 2018/0316275 | A1* | 11/2018 | Yoshida | H02M 7/217 |
| 2019/0123549 | A1* | 4/2019 | Rodrigues | G06F 1/266 |
| 2020/0313424 | A1* | 10/2020 | Woo | H02J 50/80 |

FOREIGN PATENT DOCUMENTS

| | | | |
|---|---|---|---|
| JP | 2002017001 A | | 1/2002 |
| JP | 2003153588 A | | 5/2003 |
| JP | 2009219285 A | * | 9/2009 |
| JP | 2013090416 A | | 5/2013 |
| JP | 2013118760 A | | 6/2013 |
| JP | 2015073431 A | | 4/2015 |
| JP | 2016073146 A | | 5/2016 |
| JP | 2017103976 A | | 6/2017 |
| JP | 6169272 B2 | | 7/2017 |
| JP | 61692872 B2 | | 7/2017 |
| JP | 2018191416 A | | 11/2018 |
| KR | 2017002085 A | | 1/2017 |
| KR | 1020170002085 A | | 1/2017 |
| KR | 2019056084 A | | 5/2019 |
| KR | 1020190056084 A | | 5/2019 |
| KR | 102003360 B1 | | 7/2019 |
| KR | 2019078550 A | | 7/2019 |
| KR | 1020190078550 A | | 7/2019 |
| KR | 102072904 B1 | | 2/2020 |
| KR | 102267043 B1 | | 6/2021 |

* cited by examiner

[FIG. 1]
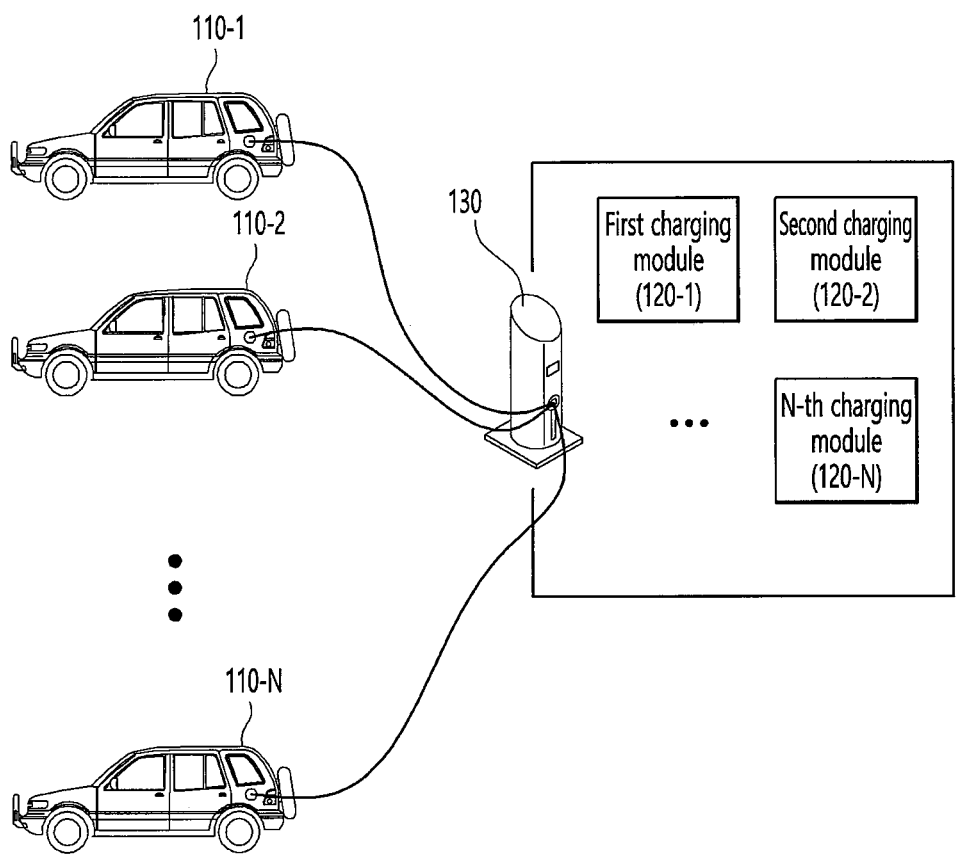

[FIG. 2]
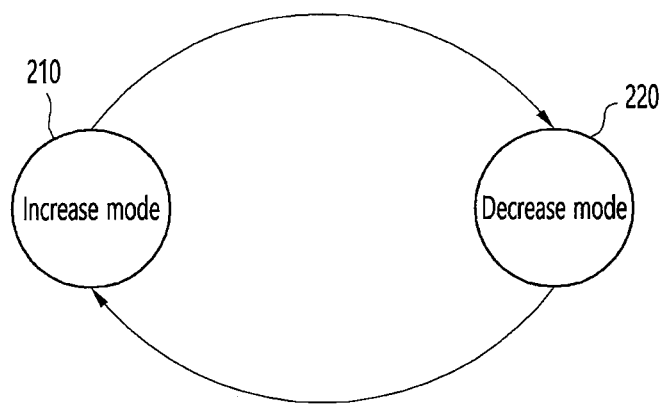

[FIG. 3]
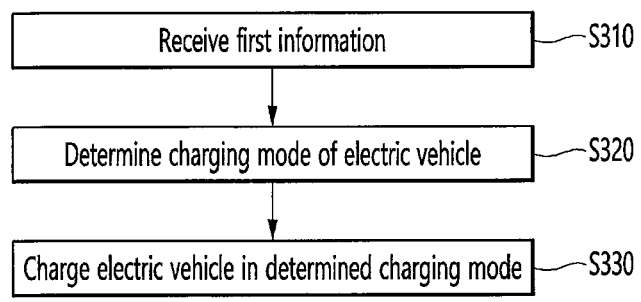

[FIG. 4]
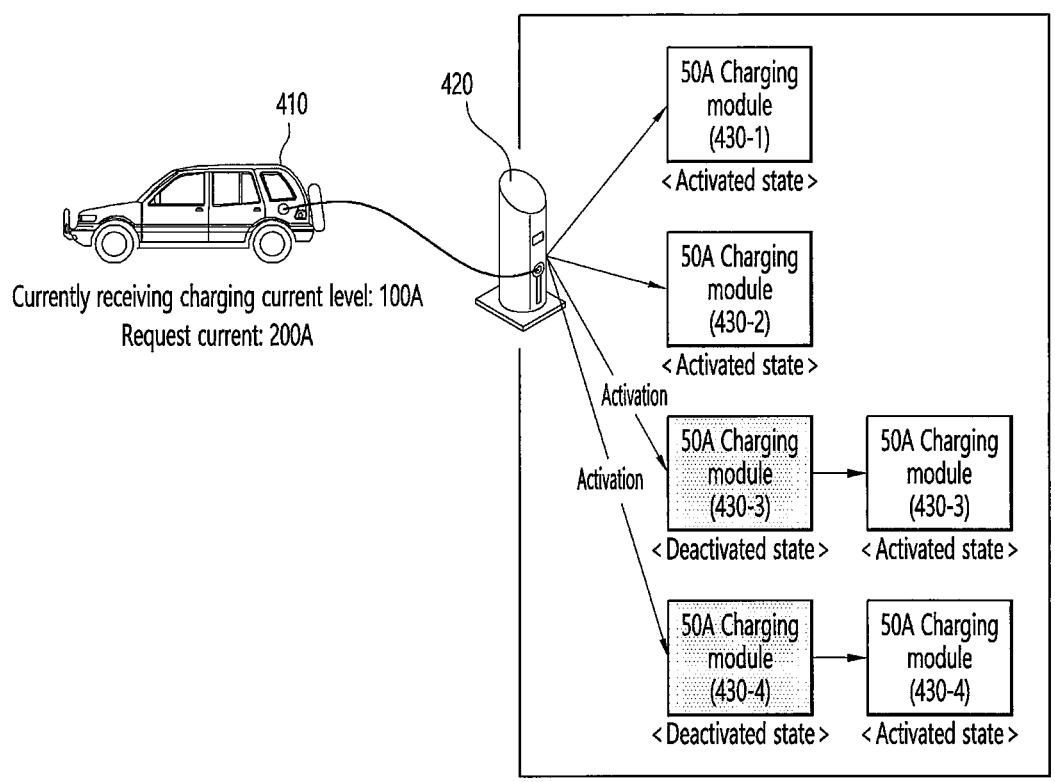

[FIG. 5]
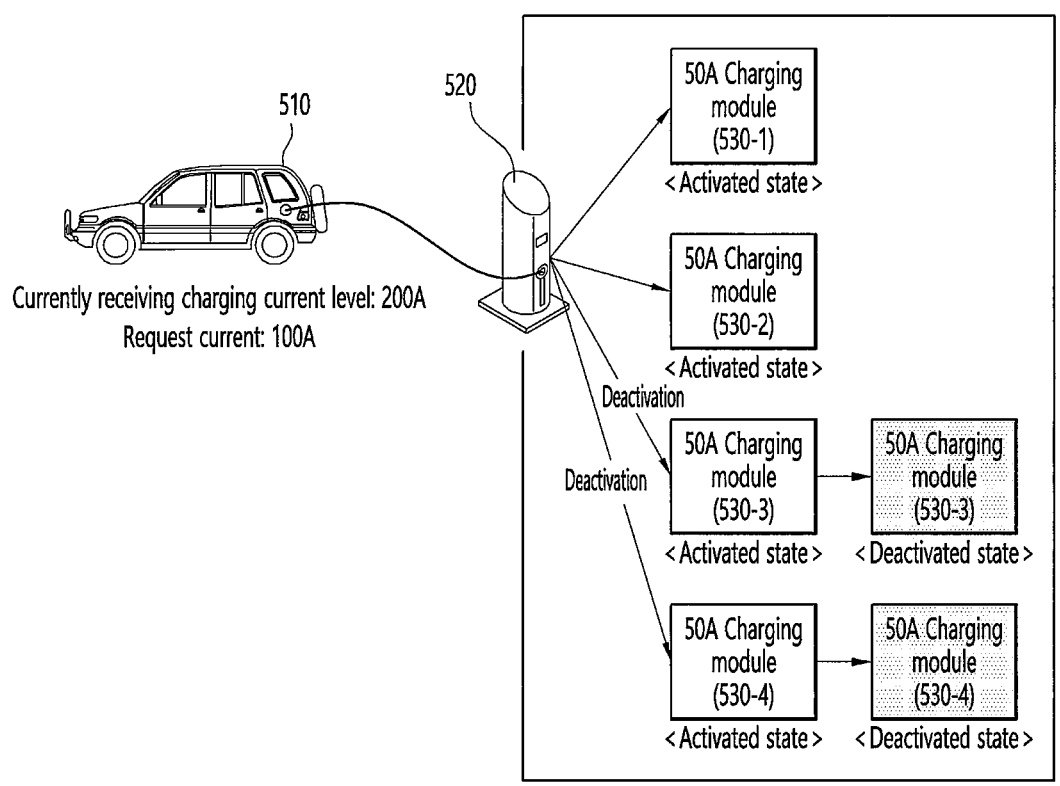

[FIG. 6]
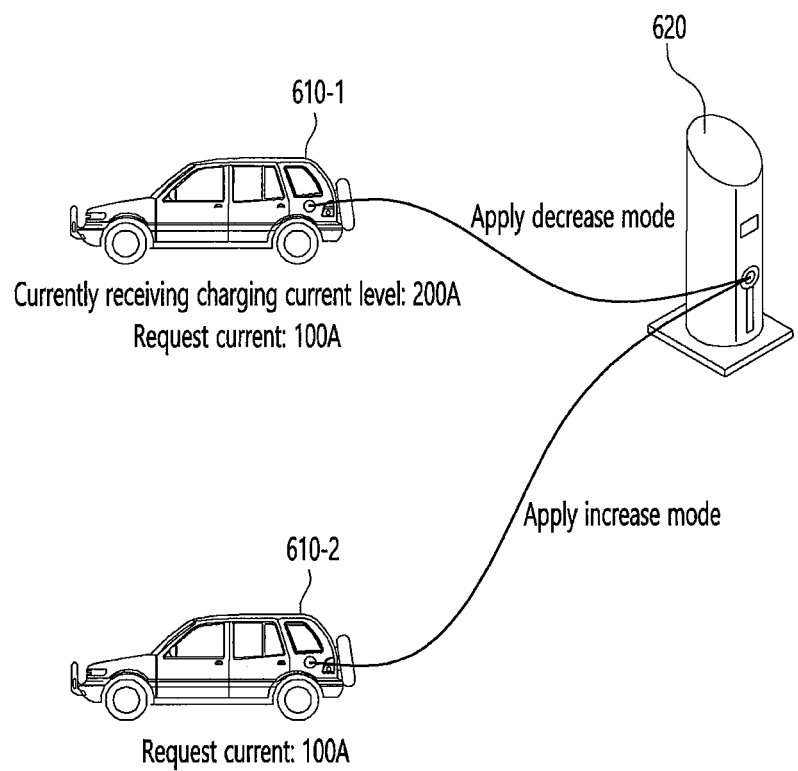

[FIG. 7]
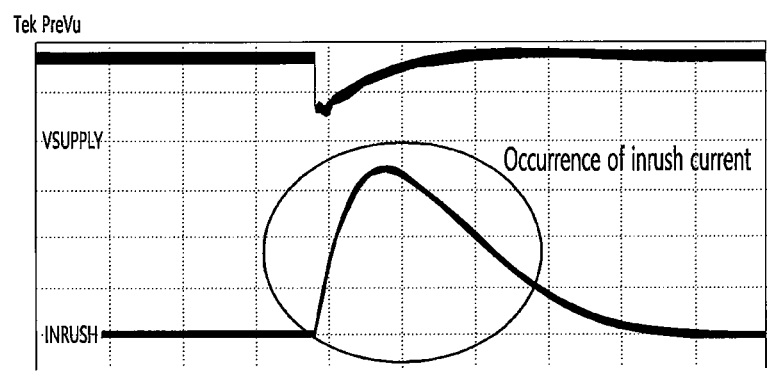

[FIG. 8]
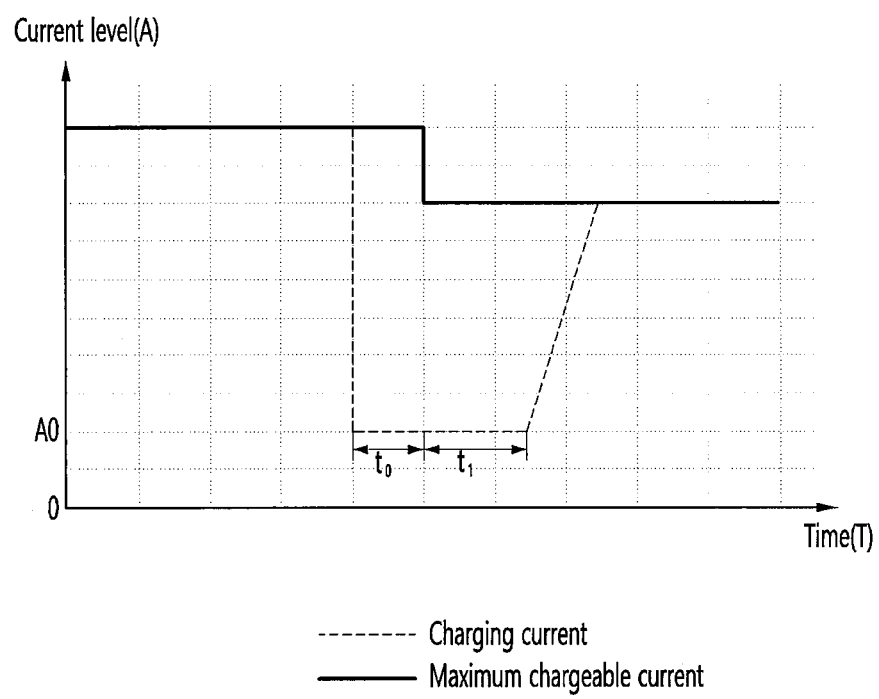

[FIG. 9]
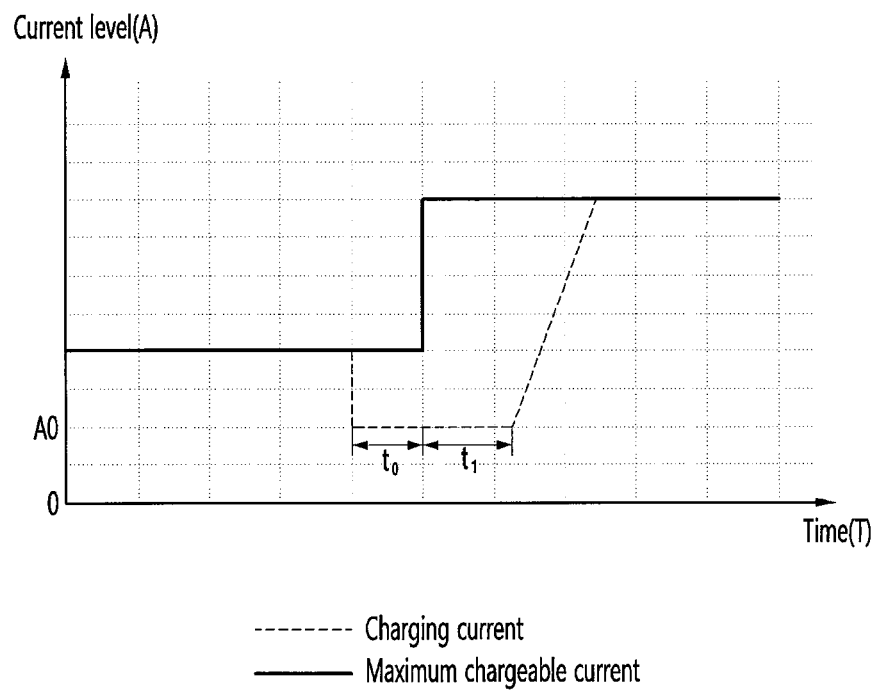

[FIG. 10]
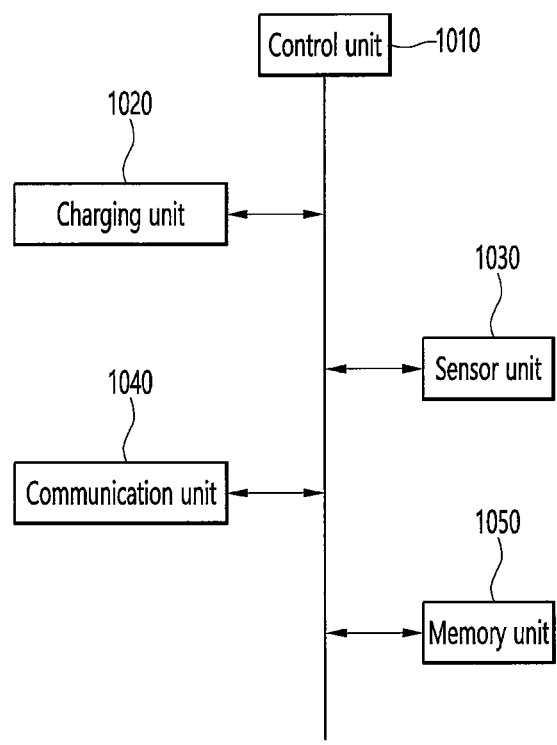

ELECTRIC VEHICLE CHARGING METHOD FOR PREVENTING INRUSH CURRENT AND DEVICE FOR THE SAME

CROSS-REFERENCE TO RELATED APPLICATIONS

The present application is a bypass continuation application of currently pending international application No. PCT/KR2021/007759 having an international filing date of Jun. 21, 2021 and designating the United States, the international application claiming a priority date of Sep. 22, 2020 based upon prior filed K.R patent application No. 10-2020-0122162 and a priority date of Jun. 14, 2021 based upon prior filed K.R patent application No. 10-2021-0076934, the entire contents of the aforesaid international application and the aforesaid K.R. patent application being incorporated herein by reference.

BACKGROUND

The present disclosure relates to a method for charging an electric vehicle using a plurality of charging modules and a device for the same. Further, the present disclosure relates to a method for preventing an inrush current and a device for the same.

Recently, the demand for eco-friendly electric vehicles (EVs) has been increased depending on the trend of reinforcement of global environmental regulations and energy cost reduction. As automotive fuel economy and exhaust gas regulations of governments around the world are strengthened, the spread of EVs has been required, and even in Korea, as part of low-carbon green growth, interest and research on green cars (eco-friendly vehicles) have been actively conducted.

In order to expand the spread of electric vehicles (EVs), it is required to establish a charging infrastructure capable of charging the power of the electric vehicles. In particular, increasing the battery capacity of the electric vehicles has a disadvantage of increasing the weight of the vehicle body, and as a result, an operable distance of the EV by once full-charging may be limited. Accordingly, in addition to household charging facilities, many chargers need to be essentially installed so as to charge electric vehicles anytime everywhere during medium- and long-distance driving.

However, in the case of conventional chargers, since only one charging module is used, there is a problem that the maximum efficiency is not usable for charging the electric vehicle, and as a result, the power waste occurs.

For example, when a maximum output level of one charging module provided in the charger is 500 V and 20 A, the charging output amount needs to be gradually reduced as the electric vehicle is gradually charged. Eventually, since the maximum output level of the charger is not fully used, the charge efficiency is not only reduced, but also the power waste will occur.

An object of the present disclosure is to solve a power waste problem which may occur by using one charging module.

SUMMARY

According to an aspect of the present disclosure, there is provided a charging method of an electric vehicle charger including the steps of receiving first information on a charging current level requested by a first electric vehicle to be charged from the first electric vehicle to be charged; determining a charging mode of the first electric vehicle to be charged based on the first information, in which the charging mode includes an increase mode of charging the first electric vehicle to be charged by selectively activating at least one deactivating charging module among the plurality of charging modules and a decrease mode of selectively deactivating at least one charging module activated to charge the first electric vehicle to be charged; and charging the first electric vehicle to be charged in the determined charging mode.

The plurality of charging modules may have all the same maximum output current.

In the determining of the charging mode, the charging mode may be determined as the increase mode when the charging current level requested by the first electric vehicle to be charged is larger than the sum of maximum output currents of the charging module while being currently connected to the first electric vehicle to be charged, and determined as the decrease mode when the charging current level requested by the first electric vehicle to be charged is smaller than the sum of maximum output currents of the charging module while being currently connected to the first electric vehicle to be charged.

When the increase mode is applied, the charging of the first electric vehicle to be charged may include selectively activating the charging modules by the number of rounding up a result obtained by dividing the charging current level requested by the first electric vehicle to be charged by the maximum output current and charging the first electric vehicle to be charged using the activated charging modules.

In the increase mode, the maximum number of charging modules to be selectively activated may be limited to the number of charging modules which are currently being deactivated.

When the decrease mode is applied, the charging of the first electric vehicle to be charged may include selectively deactivating charging modules as large as a number obtained by rounding up a result obtained by dividing the charging current level requested by the first electric vehicle to be charged by the maximum output current from the number of charging modules activated for charging of the first electric vehicle to be charged.

In the decrease mode, the maximum number of charging modules to be selectively deactivated may be limited to the number of charging modules which are being currently activated to charge the first electric vehicle to be charged.

The charging method of the electric vehicle charger may further include using a charging module selectively deactivated as the decrease mode is applied for charging of a second electric vehicle to be charged which is a charging target with a lower priority.

The charging method of the electric vehicle charger may further include storing second information on an activated number and/or an activating cycle of each of the plurality of charging modules.

Based on the second information, in the case of the increase mode, a charging module activated at the least number and/or the rarest cycle of the plurality of charging modules may be first selected and activated, and in the case of the decrease mode, a charging module activated at the most number and/or the most frequent cycle among the plurality of charging modules may be first selected and deactivated.

The charging step may include the steps of decreasing a currently charging current level for the first electric vehicle to be charged at a predetermined ratio before activating or deactivating the at least one charging module; checking whether an inrush current occurs for a first time; activating or deactivating the at least one charging module when the inrush current does not occur; checking whether the inrush current occurs for a second time after activating or deactivating; and increasing the charging current level by the charging current level requested by the first electric vehicle to be charged, when the inrush current does not occur.

The predetermined ratio may correspond to 10% of the currently charging current level.

According to another aspect of the present disclosure, there is provided an electric vehicle charger including a charging unit including a plurality of charging modules; a communication unit performing communication with an electric vehicle to be charged; and a control unit controlling the charging unit and the communication unit, in which the control unit receives first information on a charging current level requested by a first electric vehicle to be charged from the first electric vehicle to be charged, determines a charging mode of the first electric vehicle to be charged based on the first information, in which the charging mode includes an increase mode of charging the first electric vehicle to be charged by selectively activating at least one deactivating charging module among the plurality of charging modules and a decrease mode of selectively deactivating at least one charging module activated to charge the first electric vehicle to be charged, and charges the first electric vehicle to be charged in the determined charging mode.

According to an aspect of the present disclosure, there is provided a method for preventing an inrush current of an electric vehicle charger including the steps of determining whether there is a need for an increase or decrease in a charging current level while currently supplied to an electric vehicle to be charged according to a request of the electric vehicle to be charged; decreasing the charging current level at a predetermined ratio when it is determined that there is the need for the increase or decrease in the charging current level; checking whether an inrush current occurs for a first time; activating or deactivating at least one charging module to increase or decrease the charging current level according to the request of the electric vehicle to be charged, when the inrush current does not occur for the first time; checking whether the inrush current occurs for a second time; and increasing the charging current level by the charging current level requested by the electric vehicle to be charged, when the inrush current does not occur for the second time.

The inrush current may correspond to a higher level of current than a predefined reference current by a predetermined level or more.

The predetermined ratio may correspond to 10% of the charging current level.

The determining of whether there is the need for the increase or decrease of the charging current level may include the steps of comparing a current level requested by the electric vehicle to be charged with the charging current level; determining that there is the need for the decrease of the charging current level when the requested current level is less than the charging current level; and determining that there is the need for the increase of the charging current level when the requested current level is more than the charging current level.

The activating or deactivating of the at least one charging module may include the steps of selectively deactivating at least one of currently activating charging modules when it is determined that there is a need for the decrease of the charging current level; and selectively activating at least one of currently deactivating charging modules when it is determined that there is a need for the increase of the charging current level.

The selectively deactivating of at least one of the currently activating charging modules may include selectively deactivating first at least one charging module activated at the most number and/or the most frequent cycle among the currently activating charging modules.

The selectively activating of at least one of the currently deactivating charging modules may include selectively activating first at least one charging module activated at the least number and/or the rarest cycle among the currently deactivating charging modules.

The method for preventing an inrush current of the electric vehicle charger may further include recording information on at least one of an activation number and an activation cycle of the at least one charging module.

According to another aspect of the present disclosure, there is provided an electric vehicle charger including a charging unit including a plurality of charging modules; a communication unit performing communication with an electric vehicle to be charged; and a control unit controlling the charging unit and the communication unit, in which the control unit may determine whether there is a need for an increase or decrease in a charging current level while currently supplied to the electric vehicle to be charged according to a request of the electric vehicle to be charged received by the communication unit, decrease the charging current level at a predetermined ratio by controlling the charging unit when it is determined that there is the need for the increase or decrease in the charging current level, check whether an inrush current occurs for a first time, activate or deactivate at least one charging module by controlling the charging unit to increase or decrease the charging current level according to the request of the electric vehicle to be charged, when the inrush current does not occur for the first time, check whether the inrush current occurs for a second time, and increase the charging current level by the charging current level requested by the electric vehicle to be charged by controlling the charging unit, when the inrush current does not occur for the second time.

The inrush current may correspond to a higher level of current than a predefined reference current by a predetermined level or more.

The predetermined ratio may correspond to 10% of the charging current level.

When it is determined that there is the need for the increase or decrease of the charging current level, the control unit may compare a current level requested by the electric vehicle to be charged with the charging current level, determine that there is the need for the decrease of the charging current level when the requested current level is less than the charging current level, and determine that there is the need for the increase of the charging current level when the requested current level is more than the charging current level.

When activating or deactivating the at least one charging module, the control unit may selectively deactivate at least one of currently activating charging modules when it is determined that there is a need for the decrease of the charging current level, and selectively activate at least one of currently deactivating charging modules when it is determined that there is a need for the increase of the charging current level.

When selectively deactivating at least one of the currently activating charging modules, the control unit may selectively deactivate first at least one charging module activated at the most number and/or the most frequent cycle among the currently activating charging modules.

When selectively activating at least one of the currently deactivating charging modules, the control unit may selectively activate first at least one charging module activated at the least number and/or the rarest cycle among the currently deactivating charging modules.

The control unit may record information on at least one of an activation number and an activation cycle of the at least one charging module.

According to an exemplary embodiment of the present disclosure, it is possible to increase the charge efficiency and reduce the power waste by using the maximum output level of each charging module as much as possible.

Further, according to an exemplary embodiment of the present disclosure, since a power sharing operation is enabled using a plurality of charging modules, it is possible to simultaneously charge a plurality of electric vehicles.

Further, according to an exemplary embodiment of the present disclosure, it is possible to prevent an inrush current.

DESCRIPTION OF THE DRAWINGS

FIG. 1 is a diagram illustrating a charger according to an exemplary embodiment of the present disclosure.

FIG. 2 is a diagram illustrating a charging mode according to an exemplary embodiment of the present disclosure.

FIG. 3 is a flowchart illustrating a charging method of a charger according to an exemplary embodiment of the present disclosure.

FIG. 4 is a flowchart illustrating a charging method in an increase mode of the charger according to an exemplary embodiment of the present disclosure.

FIG. 5 is a flowchart illustrating a charging method in a decrease mode of the charger according to an exemplary embodiment of the present disclosure.

FIG. 6 is a diagram illustrating a power sharing operation according to an exemplary embodiment of the present disclosure.

FIG. 7 is a graph showing a current detected from the charger when an inrush current occurs according to an exemplary embodiment of the present disclosure.

FIG. 8 is a graph showing an inrush current prevention operation when applying a decrease mode of the charger according to an exemplary embodiment of the present disclosure.

FIG. 9 is a graph showing an inrush current prevention operation when applying an increase mode of the charger according to an exemplary embodiment of the present disclosure.

FIG. 10 is a block diagram illustrating a charger according to an exemplary embodiment of the present disclosure.

DETAILED DESCRIPTION

The present disclosure to be described below may have various modifications and various exemplary embodiments, and specific exemplary embodiments will be illustrated in the drawings and described in detail. However, the present disclosure to be described below is not limited to specific exemplary embodiments, and it should be understood that the present disclosure covers all modifications, equivalents and replacements included within the technical idea and technical scope of the present disclosure.

Terms such as first, second, A, B, and the like may be used for describing various components, but the components are not limited by the terms and the terms are used only for distinguishing one component from other components. For example, a first component may be referred to as a second component, and similarly, the second component may also be referred to as a first component, without departing from the scope of the invention to be described below. A term 'and/or' includes a combination of a plurality of associated disclosed items or any item of the plurality of associated disclosed items.

It is to be understood that singular expressions encompass plural expressions unless otherwise indicated in the context, and it should be understood that the term "including" or the like indicates that a feature, a number, a step, an operation, a component, a part or the combination thereof described herein is present, but does not exclude a possibility of presence or addition of one or more other features, numbers, steps, operations, components, parts or combinations thereof.

Before the detailed description of the drawings, the distinction to components herein is to clarify that each component is only distinguished for each main function of each component. That is, two or more components to be described below may be combined into one component or one component may be divided into two or more components for each subdivided function. In addition, each of the components to be described below may additionally perform some or all of the functions that are handled by other components in addition to main functions that the corresponding component is responsible for, and some of the main functions of which the respective components are charged may be exclusively carried out by other components.

Further, in performing methods or operating methods, respective processes of configuring the method may be performed differently from a specified order unless otherwise disclose a specific order in the context. That is, the respective processes may be performed similarly to the specified order, performed substantially simultaneously, and performed in an opposite order.

FIG. 1 is a diagram illustrating a charger according to an exemplary embodiment of the present disclosure.

Referring to FIG. 1, a charger 130 proposed herein includes a plurality of charging modules 120-1 to 120-N.

As described above, since a conventional charger used only one module, as an electric vehicle is gradually charged, the output power (especially, a current) is reduced, and as a result, there is a problem that the charge efficiency is lowered and the power waste is severe. In order to solve this problem, the present disclosure provides the charger 130 for performing charging by using the plurality of charging modules 120-1 to 120-N.

When the charging of an electric vehicle 110 is completed by a predetermined ratio when using the plurality of charging modules 120-1 to 120-N, the charger 130 may deactivate the charging module 120 one by one and charge the electric vehicle 110 by maximally using the maximum output power of the remaining activated charging modules 120. As a result, since each charging module 120 may be charged while exhibiting the maximum charge efficiency, the overall charging efficiency is improved and the power waste is reduced.

The plurality of charging modules 120-1 to 120-N may be easily used for a power sharing operation. For example, when charging the electric vehicle 110, each charging module 120 may operate independently of other charging modules 120. Thus, the charger 130 may perform the charging by using/activating all the charging modules 120-1 to 120-N or using/activating only one charging module 120 to use one electric vehicle 110. The charging modules 120 that are not used for charging may be used to charge other electric vehicles 110, which eventually corresponds to the power sharing operation.

The plurality of charging modules 120-1 to 120-N may be the same as or different from each other in the maximum output current (or power) level. In this specification, for convenience of description, it is assumed that all of the plurality of charging modules 120-1 to 120-N in the charger 130 have the same maximum output current level.

Basically, the charger 130 of the present disclosure first allocates the charging module to be used for charging to an electric vehicle 110-1 on which charging is first reserved (or charging is requested) and allocates the charging modules by comprehensively considering a requested charging amount of the corresponding electric vehicles 110-2 to 110-N, the number of charging modules 120 to be currently allocated (i.e., charging modules during deactivating/unusing), and the like with respect to lower-priority electric vehicles 110-2 to 110-N. Hereinafter, for convenience of description, an electric vehicle which is charging by the current charger 130 using at least one charging module is referred to as a 'first electric vehicle to be charged 110-1' and lower-priority electric vehicles to be charged 110-2 to 110-N are referred to as a 'second electric vehicle to be charged'.

Furthermore, the charger 130 of the present disclosure first determines a charging mode of the electric vehicle 110 requesting the charging and performs the charging based on the corresponding charging mode, and the charging mode will be described below with reference to FIG. 2.

FIG. 2 is a diagram illustrating a charging mode according to an exemplary embodiment of the present disclosure.

Referring to FIG. 2, the charger may charge the electric vehicle in an increase mode 210 or a decrease mode 220.

The increase mode 210 corresponds to a mode of charging the first electric vehicle to be charged by selectively activating at least one charging module while being deactivated among the plurality of charging modules. The decrease mode 220 corresponds to a mode of selectively deactivating at least one of the charging modules activated to charge the first electric vehicle to be charged. A specific exemplary embodiment of each mode will be described below in detail with reference to FIGS. 3 to 5.

The charger determines in real time which mode is to be applied according to a charging request current level and a charging state (e.g., the number of charging modules to be used for current charging, and the like) of the electric vehicle to be charged and performs the charging operation according to a determined mode.

FIG. 3 is a flowchart illustrating a charging method of a charger according to an exemplary embodiment of the present disclosure. FIG. 4 is a flowchart illustrating a charging method in an increase mode of the charger according to an exemplary embodiment of the present disclosure. FIG. 5 is a flowchart illustrating a charging method in a decrease mode of the charger according to an exemplary embodiment of the present disclosure.

First, referring to FIG. 3, first, the charger may receive first information on the charging current level requested by the first electric vehicle to be charged from the first electric vehicle to be charged (S310). To this end, the charger may use various communication protocols according to the standard of the electric vehicle to be charged.

For example, when the first electric vehicle to be charged satisfies a direct current (DC) combo standard, the first electric vehicle to be charged may transmit 'EVTargetCurrent' corresponding to request current information included in a message 'CurrentDemand' to the charger using a programmable logic controller (PLC) communication protocol. Alternatively, when the first electric vehicle to be charged satisfies a CHAdeMO standard, the first electric vehicle to be charged may transmit a request current value included in 'CAN ID 0x102' to the charger using a controller area network (CAN) communication protocol. Alternatively, when the first electric vehicle to be charged satisfies a GB/T standard, the first electric vehicle to be charged may transmit a request current value included in a message 'CAN ID BLC' to the charger using a CAN communication protocol.

Next, the charger may determine a charging mode of the first electric vehicle to be charged based on the first information (S310).

More specifically, when the charging current level requested by the first electric vehicle to be charged is larger than the sum of maximum output currents of the charging module while being currently connected to the first electric vehicle to be charged, the charger may determine a charging mode of the first electric vehicle to be charged as an increase mode.

For example, as illustrated in FIG. 4, it may be assumed that a charger 420 includes four charging modules 430-1 to 430-4 having output current levels and a first electric vehicle to be charged 410 receives a charging current level of 100 A through two charging modules 430-1 and 430-2 from the current charger 420. At this time, the level of the current requested by the first electric vehicle to be charged 410 may be increased to 200 A by various causes (e.g., a case where the user inputs an increase command of a vehicle charging rate/amount, etc.). In this case, the charger 420 may determine the charging mode of the first electric vehicle to be charged 410 as the increase mode.

In addition, when the charging current level requested by the first electric vehicle to be charged is smaller than the sum of maximum output currents of the charging module while being currently connected to the first electric vehicle to be charged, the charger may determine a charging mode of the first electric vehicle to be charged as a decrease mode.

For example, as illustrated in FIG. 5, it may be assumed that a charger 510 includes four charging modules 530-1 to 530-4 having output current levels of 50 A and a first electric vehicle to be charged 510 receives a charging current level of 200 A through the four charging modules 530-1 and 530-4 from the current charger. At this time, the level of the current requested by the first electric vehicle to be charged 510 may be decreased to 100 A by various causes (e.g., a case where the battery charging is completed by a predetermined ratio, etc.). In this case, a charger 520 may determine the charging mode of the first electric vehicle to be charged 510 as the decrease mode.

Next, the charger may charge the first electric vehicle to be charged in the charging mode determined in the previous step (S330).

More specifically, when the increase mode is applied, the charger may selectively activate the charging modules by the number of rounding up a result obtained by dividing the charging current level requested by the first electric vehicle to be charged by the maximum output current and charge the first electric vehicle to be charged using the activated charging modules.

For example, referring to FIG. 4, since the charging current level requested by the first electric vehicle to be charged 410 is 200 A and the maximum output current level is 50 A, four (=200 A/50 A) charging modules 430-1 to 430-4 need to be activated. Since only two charging modules 430-1 and 430-2 are currently activated to charge the first electric vehicle to be charged 410, the charger 420 is used to charge the first electric vehicle to be charged 410 by selectively activating two 430-3 and 430-4 of the charging modules to be currently deactivated. Accordingly, in the increase mode, the maximum number of charging modules to be selectively activated is limited to the number of charging modules which are currently being deactivated.

Similarly, when the decrease mode is applied, the charger may selectively deactivate charging modules as large as a number obtained by rounding up a result obtained by dividing the charging current level requested by the first electric vehicle to be charged by the maximum output current from the number of charging modules activated for charging of the first electric vehicle to be charged.

For example, referring to FIG. 5, since the charging current level currently provided to the first electric vehicle to be charged 510 is 200 A, the requested charging current level is 100 A, and the maximum output current level is 50 A, two charging modules as a result obtained by subtracting 2 (=100 A/50 A) from 4 (200 A/50 A) need to be deactivated. Since four charging modules 530-1 to 530-4 are currently activated to charge the first electric vehicle to be charged 510, the charger 520 charges the first electric vehicle to be charged 510 by selectively deactivating two 530-3 and 530-4 of the four charging modules 530-1 to 530-4 activated. Accordingly, in the decrease mode, the maximum number of charging modules to be selectively deactivated is limited to the number of charging modules which are being currently activated to charge the first electric vehicle to be charged.

The charger converts an activated/deactivated state of the charging modules according to the charging mode of the electric vehicle to be charged, and at this time, the charger may perform activation/deactivation of the charging modules selectively based on an activated number and/or an activating cycle of each charging module.

More specifically, the charger may first store second information on an activated number and/or an activating cycle of each of the plurality of charging modules. Based on the second information stored above, the charger may first select and activate a charging module activated at the least number and/or the rarest cycle of the plurality of charging modules when applying the increase mode. Further, the charger may first select and deactivate a charging module activated at the most number and/or the most frequent cycle among the plurality of charging modules when applying the decrease mode.

As such, since the charger performs the activation/deactivation operation selectively by considering the activation cycle/frequency of each charging module, it is possible to prevent the intensive deterioration of some charging modules and equally manage the overall lifetime of the charging modules.

FIG. 6 is a diagram illustrating a power sharing operation according to an exemplary embodiment of the present disclosure.

As described above, a charger 620 of the present disclosure includes a plurality of charging modules, and since each of these charging modules enables an independent charging operation, the charger 620 may perform a power sharing function capable of simultaneously charging a plurality of electric vehicles 610-1 and 610-2 once. Accordingly, as the charging of a first electric vehicle to be charged 610-1 is completed, the sequentially deactivated charging module may be used to charge a second electric vehicle to be charged 610-2 which is a lower-priority charging target.

For example, referring to FIG. 6, when a charging current level currently received by the first electric vehicle to be charged 610-1 is 200 A and a request current is 100 A, a decrease mode may be applied, and as a result, two 50 A charging modules may be deactivated. The two charging modules deactivated as such may be used for charging the lower-priority electric vehicle to be charged 610-2. In FIG. 6, since the current requested by the second electric vehicle to be charged 610-2 is 100 A, all of two charging modules may be used to charge the second electric vehicle to be charged 610-2. When the request current of the second electric vehicle to be charged 610-2 is 50 A, only one charging module may be activated for the second electric vehicle to be charged 610-2, and the remaining charging modules may be used for charging the next lower-priority electric vehicle to be charged.

FIG. 7 is a graph showing a current detected from the charger when an inrush current occurs according to an exemplary embodiment of the present disclosure.

While the charger activates/deactivates the charging module, as illustrated in FIG. 7, an inrush current as a high level of current may be suddenly introduced. The inrush current is a very higher level of current than a reference charging current, and safety and maintenance problems are caused in the charging process of the electric vehicle. Particularly, in an electric vehicle charger for supplying a three-phase alternating current to the electric vehicle, an unnecessary operation of a circuit breaker and unnecessary tripping of an earth leakage breaker are caused in the charger due to the inrush current. Therefore, it is very important to prevent the inrush current in activating/deactivating the charging module.

The present disclosure provides an operation of a charger for preventing the inrush current, and will be described below with reference to FIGS. 8 and 9.

FIG. 8 is a graph showing an inrush current prevention operation when applying a decrease mode of the charger according to an exemplary embodiment of the present disclosure.

Referring to FIG. 8, the charger may first reduce a currently charging current level to a predetermined ratio A0 when applying the decrease mode to prevent the inrush current. Here, the predetermined ratio may correspond to, for example, 10% of the currently charging current level.

Next, the charger may check whether the inrush current occurs for a predetermined time t0. If it is checked that the inrush current does not occur for the predetermined time t0, the charger may deactivate the charging module which was intended to be deactivated. As a result, a maximum chargeable current of the charger is reduced by a maximum chargeable current of the deactivated charging module.

Next, the charger may check whether the inrush current occurs according to the deactivation of the charging module again for a predetermined time t1. If it is checked that the inrush current does not occur for the predetermined time t1, the charger increases a charging current level by a charging current level requested by the first electric vehicle to be charged to return to an original charging operation/algorithm.

FIG. 9 is a graph showing an inrush current prevention operation when applying an increase mode of the charger according to an exemplary embodiment of the present disclosure.

Referring to FIG. 9, the charger may first reduce a currently charging current level to a predetermined ratio A0 when applying the increase mode to prevent an inrush current. Here, the predetermined ratio may correspond to, for example, 10% of the currently charging current level.

Next, the charger may check whether the inrush current occurs for a predetermined time t0. If it is checked that the inrush current does not occur for the predetermined time t0, the charger may activate the charging module which was intended to be activated. As a result, a maximum chargeable current of the charger is increased by a maximum chargeable current of the activated charging module.

Next, the charger may check whether the inrush current occurs according to the activation of the charging module again for a predetermined time t1. If it is checked that the inrush current does not occur for the predetermined time t1, the charger increases a charging current level by a charging current level requested by the first electric vehicle to be charged to return to an original charging operation/algorithm.

According to the exemplary embodiment of FIGS. 8 and 9 described above, the charger of the present disclosure has advantages of lowering the charging current level by a predetermined ratio before activating or deactivating the charging module to prevent the inrush current in advance and continuously detecting the inrush current before and after activating/deactivating to minimize the damage according to the occurrence of the inrush current.

FIG. 10 is a block diagram illustrating a charger according to an exemplary embodiment of the present disclosure.

Hereinafter, configurations to be described below may be implemented by at least one hardware/software components and may be used to perform the exemplary embodiments described above.

Referring to FIG. 10, the charger may include a control unit 1010, a charging unit 1020, a sensor unit 1030, a communication unit 1040, and/or a memory unit 1050.

The control unit 1010 may not only communicate with other components included in the charger, but also may control the components. In particular, the control unit 1010 may subjectively perform various exemplary embodiments described in the present disclosure by controlling at least one component included in the charger. Accordingly, the charger of the present disclosure may be described to be identified with the control unit 1010. The control unit 1010 may be implemented by at least one processor.

The charging unit 1020 may include a hardware component necessary for charging the electric vehicle. For example, the charging unit 1020 may include a plurality of charging modules and a charging connection unit for connecting the electric vehicle and the charger to supply power.

The sensor unit 1030 senses a peripheral environment inside/outside the charger and may transmit a sensing result to the control unit. For example, the sensor unit 1030 may include at least one current/voltage detection sensor, and may monitor an internal current/voltage in real time to notify the result to the control unit. In particular, the sensor unit 1030 may sense the inrush current before and after activation/deactivation of the charging module and transmit the result to the control unit 1010.

The communication unit 1040 may perform communication with the outside using at least one communication protocol. In particular, the communication unit 1040 may perform the communication using PLC, CAN, WiFi, Bluetooth, and NFC, as at least one communication protocol. The communication unit 1040 may transmit a signal/information/data transmitted and received through communication to the control unit and may transmit the signal/information/data received from the control unit 1010 to the outside.

The memory unit 1050 may store various information/data/programs/applications, and the like. The memory unit 1050 may transmit the stored information/data to the control unit or receive the stored information/data from the control unit 1010. Particularly, the memory unit 1050 according to the present disclosure may store information/data on frequency/number/period, and the like at which each charging module is activated (or deactivated).

Meanwhile, for convenience of description, in the present disclosure, in FIGS. 1 and 6, etc., an exemplary embodiment in which a plurality of connection terminals is provided in one charger and one charger is connected with a plurality of electric vehicles through the plurality of connection terminals has been illustrated, but is not limited thereto. Of course, a plurality of dispensers is provided in one charger and the charger may also be connected with the plurality of electric vehicles through the plurality of dispensers.

Although the drawings have been described for the sake of convenience of explanation, it is also possible to design a new exemplary embodiment to be implemented by merging the exemplary embodiments described in each drawing. Further, configurations and methods of the described exemplary embodiments may not be limitedly applied to the aforementioned present disclosure, but all or some of the respective exemplary embodiments may be selectively combined and configured so as to be variously modified.

Further, while the exemplary embodiments of the present disclosure have been illustrated and described above, the present disclosure is not limited to the aforementioned specific exemplary embodiments, various modifications may be made by a person with ordinary skill in the technical field to which the present disclosure pertains without departing from the subject matters of the present disclosure that are claimed in the claims, and these modifications should not be appreciated individually from the technical spirit or prospect of the present disclosure.

The present disclosure may be applied to various electric vehicle charging technical fields and inrush current prevention technical fields.

The invention claimed is:

1. A method for preventing an inrush current of an electric vehicle charger comprising steps of:
    determining whether there is a need for an increase or decrease in a charging current level while currently supplied to an electric vehicle to be charged according to a request of the electric vehicle;
    decreasing the charging current level at a predetermined ratio when it is determined that there is the need for the increase or decrease in the charging current level;
    checking whether an inrush current occurs for a first time;
    when the inrush current does not occur for the first time, performing one of:
        activating at least one additional charging module, among a plurality of charging modules of the electric vehicle charger, the at least one additional charging module being activated for supplying charging current to the electric vehicle concurrently with at least one other charging module, among the plurality of charging modules, currently being used to supply charging current to the electric vehicle, to increase the charging current level according to the request of the electric vehicle, or
        deactivating at least one of multiple charging modules among a plurality of charging modules of the electric vehicle charger, the multiple charging modules currently being used to concurrently supply charging current to the electric vehicle, to decrease the charging current level according to the request of the electric vehicle;

checking whether the inrush current occurs for a second time; and increasing the charging current level by the charging current level requested by the electric vehicle, when the inrush current does not occur for the second time, wherein the determining of whether there is the need for the increase or decrease of the charging current level includes steps of:

comparing a current level requested by the electric vehicle to be charged with the charging current level;

determining that there is the need for the decrease of the charging current level when the requested current level is less than the charging current level; and determining that there is the need for the increase of the charging current level when the requested current level is more than the charging current level, wherein the activating or deactivating of the at least one charging module includes steps of:

selectively deactivating at least one of currently activated charging modules when it is determined that there is the need for the decrease of the charging current level; and selectively activating at least one of currently deactivated charging modules when it is determined that there is the need for the increase of the charging current level, and wherein the selectively deactivating of at least one of the currently activated charging modules includes selectively deactivating first at least one charging module activated in at least one of the most number or the most frequent cycle among the currently activated charging modules.

2. A method for preventing an inrush current of an electric vehicle charger comprising steps of:

determining whether there is a need for an increase or decrease in a charging current level while currently supplied to an electric vehicle to be charged according to a request of the electric vehicle;

decreasing the charging current level at a predetermined ratio when it is determined that there is the need for the increase or decrease in the charging current level;

checking whether an inrush current occurs for a first time;

when the inrush current does not occur for the first time, performing one of:

activating at least one additional charging module, among a plurality of charging modules of the electric vehicle charger, the at least one additional charging module being activated for supplying charging current to the electric vehicle concurrently with at least one other charging module, among the plurality of charging modules, currently being used to supply charging current to the electric vehicle, to increase the charging current level according to the request of the electric vehicle, or deactivating at least one of multiple charging modules among a plurality of charging modules of the electric vehicle charger, the multiple charging modules currently being used to concurrently supply charging current to the electric vehicle, to decrease the charging current level according to the request of the electric vehicle;

checking whether the inrush current occurs for a second time; and increasing the charging current level by the charging current level requested by the electric vehicle, when the inrush current does not occur for the second time, wherein the determining of whether there is the need for the increase or decrease of the charging current level includes steps of:

comparing a current level requested by the electric vehicle to be charged with the charging current level;

determining that there is the need for the decrease of the charging current level when the requested current level is less than the charging current level; and determining that there is the need for the increase of the charging current level when the requested current level is more than the charging current level, wherein the activating or deactivating of the at least one charging module includes steps of:

selectively deactivating at least one of currently activated charging modules when it is determined that there is the need for the decrease of the charging current level; and selectively activating at least one of currently deactivated charging modules when it is determined that there is the need for the increase of the charging current level, and wherein the selectively activating of at least one of the currently deactivated charging modules includes selectively activating first a charging module activated in at least one of the least number and the least frequent cycle among the currently deactivated charging modules.

3. An electric vehicle charger comprising:

a charging unit including a plurality of charging modules;

a communication unit configured to perform communication with an electric vehicle to be charged; and a control unit configured to control the charging unit and the communication unit, wherein the control unit is configured to:

determine whether there is a need for an increase or decrease in a charging current level while currently supplied to the electric vehicle according to a request of the electric vehicle received by the communication unit, and decrease the charging current level at a predetermined ratio by controlling the charging unit when it is determined that there is the need for the increase or decrease in the charging current level, check whether an inrush current occurs for a first time, wherein when the inrush current does not occur for the first time, the control unit is configured to perform one of:

activate at least one additional charging module, among a plurality of charging modules of the electric vehicle charger, by controlling the charging unit to increase the charging current level according to the request of the electric vehicle, the at least one additional charging module being activated for supplying charging current to the electric vehicle concurrently with at least one other charging module, among the plurality of charging modules, currently being used to supply charging current to the electric vehicle, or deactivate at least one of multiple charging modules among a plurality of charging modules of the electric vehicle charger, by controlling the charging unit to decrease the charging current level according to the request of the electric vehicle, the multiple charging modules currently being used to concurrently supply charging current to the electric vehicle;

check whether the inrush current occurs for a second time, and increase the charging current level by the charging current level requested by the electric vehicle by controlling the charging unit, when the inrush current does not occur for the second time, wherein when it is determined that there is the need for the increase or decrease of the charging current level, the control unit is configured to:

compare a current level requested by the electric vehicle to be charged with the charging current level, determine that there is the need for the decrease of the charging current level when the requested current level is less than the charging current level, and determine that there is the need for the increase of the charging current level when the requested current level is more than the charging current level, wherein when activating or deactivating the at least one charging module, the control unit is configured to:

selectively deactivate at least one of currently activated charging modules when it is determined that there is the need for the decrease of the charging current level, and selectively activate at least one of currently deactivated charging modules when it is determined that there is the need for the increase of the charging current level, and wherein when selectively deactivating at least one of the currently activated charging modules, the control unit is configured to selectively deactivate first at least one charging module activated at least one of at the most number or the most frequent cycle among the currently activated charging modules.

4. An electric vehicle charger comprising:

a charging unit including a plurality of charging modules;

a communication unit configured to perform communication with an electric vehicle to be charged; and a control unit configured to the charging unit and the communication unit, wherein the control unit is configured to:

determine whether there is a need for an increase or decrease in a charging current level while currently supplied to the electric vehicle according to a request of the electric vehicle received by the communication unit, and decrease the charging current level at a predetermined ratio by controlling the charging unit when it is determined that there is the need for the increase or decrease in the charging current level, check whether an inrush current occurs for a first time, when the inrush current does not occur for the first time, perform one of:

activate at least one additional charging module, among a plurality of charging modules of the electric vehicle charger, by controlling the charging unit to increase the charging current level according to the request of the electric vehicle, the at least one additional charging module being activated for supplying charging current to the electric vehicle concurrently with at least one other charging module, among the plurality of charging modules, currently being used to supply charging current to the electric vehicle, or deactivate at least one of multiple charging modules among a plurality of charging modules of the electric vehicle charger, by controlling the charging unit to decrease the charging current level according to the request of the electric vehicle, the multiple charging modules currently being used to concurrently supply charging current to the electric vehicle;

check whether the inrush current occurs for a second time, and increase the charging current level by the charging current level requested by the electric vehicle by controlling the charging unit, when the inrush current does not occur for the second time, wherein when it is determined that there is the need for the increase or decrease of the charging current level, the control unit is further configured to:

compare a current level requested by the electric vehicle to be charged with the charging current level, determine that there is the need for the decrease of the charging current level when the requested current level is less than the charging current level, and determine that there is the need for the increase of the charging current level when the requested current level is more than the charging current level, wherein when activating or deactivating the at least one charging module, the control unit is configured to:

selectively deactivate at least one of currently activated charging modules when it is determined that there is the need for the decrease of the charging current level, and selectively activate at least one of currently deactivated charging modules when it is determined that there is the need for the increase of the charging current level, and wherein when selectively activating at least one of the currently deactivated charging modules, the control unit is configured to selectively activate first a charging module activated in at least one of the least number and the least frequent cycle among the currently deactivated charging modules.

5. A charging method of an electric vehicle charger comprising steps of:

receiving first information on a charging current level requested by a first electric vehicle to be charged from the first electric vehicle to be charged;

determining a charging mode of the first electric vehicle to be charged based on the first information, wherein the charging mode includes:

an increase mode of charging the first electric vehicle to be charged by selectively activating at least one deactivated charging module among a plurality of charging modules of the electric vehicle charger, the at least one deactivated charging module being activated for supplying charging current to the first electric vehicle concurrently with at least one other charging module, among the plurality of charging modules, currently being used to concurrently supply charging current to the first electric vehicle, and a decrease mode of charging the first electric vehicle by selectively deactivating at least one of multiple charging modules, among the plurality of charging modules of the electric vehicle charger, the multiple charging modules currently being used to concurrently supply charging current to the first electric vehicle to be charged;

charging the first electric vehicle to be charged in the determined charging mode, wherein the plurality of charging modules has all the same maximum output current, wherein in the determining of the charging mode, the charging mode is determined as the increase mode when the charging current level requested by the first electric vehicle to be charged is larger than a sum of maximum output currents of the charging module while being currently connected to the first electric vehicle to be charged, and the charging mode is determined as the decrease mode when the charging current level requested by the first electric vehicle to be charged is smaller than the sum of maximum output currents of the charging module while being currently connected to the first electric vehicle to be charged, wherein when the increase mode is applied, the charging of the first electric vehicle to be charged includes:
selectively activating the charging modules by the number of rounding up a result obtained by dividing the charging current level requested by the first electric vehicle to be charged by the maximum output current and charging the first electric vehicle to be charged using the activated charging modules, wherein in the increase mode, the maximum number of charging modules to be selectively activated is limited to the number of charging modules which are currently being deactivated, wherein when the decrease mode is applied, the charging of the first electric vehicle to be charged includes:
selectively deactivating charging modules as large as a number obtained by rounding up a result obtained by dividing the charging current level requested by the first electric vehicle to be charged by the maximum output current from the number of charging modules activated for charging of the first electric vehicle to be charged, wherein in the decrease mode, the maximum number of charging modules to be selectively deactivated is limited to the number of charging modules which are being currently activated to charge the first electric vehicle to be charged;

using a charging module selectively deactivated as the decrease mode is applied for charging of a second electric vehicle to be charged which is a lower-priority charging target; and storing second information on at least one of an activated number or an activating cycle of each of the plurality of charging modules, and wherein based on the second information,
in the case of the increase mode, a charging module activated at least one of at the least number or the least frequent cycle of the plurality of charging modules is first selected and activated, and in the case of the decrease mode, a charging module activated at least one of at the most number or the most frequent cycle among the plurality of charging modules is first selected and deactivated.

6. The charging method of the electric vehicle charger of claim 5, wherein the charging step includes steps of
checking whether an inrush current occurs for a first time;
activating or deactivating the at least one charging module when the inrush current does not occur;
checking whether the inrush current occurs for a second time after activating or deactivating; and
increasing the charging current level by the charging current level requested by the first electric vehicle to be charged, when the inrush current does not occur.

7. The charging method of the electric vehicle charger of claim 6, wherein the predetermined ratio corresponds to 10% of the currently charging current level.

\* \* \* \* \*